United States Patent
Lee et al.

(10) Patent No.: US 10,237,207 B2
(45) Date of Patent: Mar. 19, 2019

(54) APPARATUS AND METHOD FOR STORING DATA TRAFFIC ON FLOW BASIS

(71) Applicant: ELECTRONICS AND TELECOMMUNICATIONS RESEARCH INSTITUTE, Daejeon (KR)

(72) Inventors: Jihyung Lee, Daejeon (KR); Sungryoul Lee, Daejeon (KR); Junghee Lee, Daejeon (KR); Yung Yi, Daejeon (KR); KyoungSoo Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 246 days.

(21) Appl. No.: 14/862,749

(22) Filed: Sep. 23, 2015

(65) Prior Publication Data
US 2017/0005952 A1    Jan. 5, 2017

(30) Foreign Application Priority Data
Jul. 1, 2015    (KR) .......................... 10-2015-0093992

(51) Int. Cl.
*H04L 12/879* (2013.01)
*H04L 12/861* (2013.01)
*H04L 29/06* (2006.01)

(52) U.S. Cl.
CPC ........ *H04L 49/901* (2013.01); *H04L 49/9042* (2013.01); *H04L 69/22* (2013.01)

(58) Field of Classification Search
None
See application file for complete search history.

(56) References Cited

U.S. PATENT DOCUMENTS 8,199,652 B2    6/2012  Lim
8,498,995 B1 *  7/2013  Gond ................. H04L 12/58
                                                  707/713
(Continued)

FOREIGN PATENT DOCUMENTS

KR    10-2004-0050454 A    6/2004
KR    10-2006-0063544 A    6/2006
(Continued)

OTHER PUBLICATIONS

Luca Deri et al., "10 Gbit Line Rate Packet-to-Disk Using n2disk," TMA, 2013.

*Primary Examiner* — Chi H Pham
*Assistant Examiner* — Raul Rivas
(74) *Attorney, Agent, or Firm* — LRK Patent Law Firm (57) ABSTRACT

An apparatus and method for storing data traffic on a flow basis. The apparatus for storing data traffic on a flow basis includes a packet storage unit, a flow generation unit, and a metadata generation unit. The packet storage unit receives packets corresponding to data traffic, and temporarily stores the packets using queues. The flow generation unit generates flows by grouping the packets by means of a hash function using information about each of the packets as input, and to store the flows. The metadata generation unit generates metadata and index data corresponding to each of the flows, and stores the metadata and the index data.

9 Claims, 7 Drawing Sheets

(56) References Cited

U.S. PATENT DOCUMENTS

| | | | |
|---|---|---|---|
| 2006/0155875 A1* | 7/2006 | Cheriton | G06F 17/30982 709/245 |
| 2013/0117847 A1 | 5/2013 | Friedman et al. | |
| 2013/0188635 A1 | 7/2013 | Park et al. | |
| 2013/0275656 A1* | 10/2013 | Talagala | G06F 12/0246 711/103 |
| 2014/0310374 A1 | 10/2014 | Lee et al. | |

FOREIGN PATENT DOCUMENTS

| | | |
|---|---|---|
| KR | 10-0586234 B1 | 6/2006 |
| KR | 10-2010-0010987 A | 2/2010 |
| KR | 10-2012-0008478 A | 1/2012 |
| KR | 10-2013-0093741 A | 8/2013 |
| KR | 10-2013-0093832 A | 8/2013 |
| KR | 10-2014-0055761 A | 5/2014 |
| KR | 10-2014-0125311 A | 10/2014 |

\* cited by examiner

APPARATUS AND METHOD FOR STORING DATA TRAFFIC ON FLOW BASIS

CROSS-REFERENCE TO RELATED APPLICATION

This application claims the benefit of Korean Patent Application No. 10-2015-0093992, filed Jul. 1, 2015, which is hereby incorporated by reference herein in its entirety.

BACKGROUND

1. Technical Field

Embodiments of the present invention relate generally to technology for storing data traffic, and more particularly to technology for storing and searching for data traffic on the basis of a flow composed of packets that constitute the data traffic.

2. Description of the Related Art

Systems for storing and searching for data traffic collect data traffic that enters a specific router or switch interface. Of conventional systems, Netflow of Cisco Systems, Inc. in the U.S. has become the de facto standard in the related industry because it is equipped with most functions including the functions of storing and searching for packets. However, Netflow requires a high-performance router or network switch compatible with Netflow in order to process a large amount of high-speed data traffic. Furthermore, when Netflow is used as a system for storing and searching for data traffic, Netflow has a problem in that indexing and searching efficiency is low because data traffic is stored on a packet basis. Furthermore, most commercial systems for storing and searching for data traffic suffer from problems attributable to high costs, lack of versatility of application, and packet-based storage and search.

Korean Patent Application Publication No. 2013-0093832 discloses a method of processing data traffic using a multi-network interface card. In greater detail, this patent publication discloses technology for examining each of the packets of data traffic and discarding a packet that does not comply with network policies.

Nevertheless, the technology disclosed in Korean Patent Application Publication No. 2013-0093832 also merely examines the inside of data traffic based on a packet unit, and does not teach processing on the basis of a flow unit composed of packets.

Accordingly, there is a need for technology capable of minimizing the time it takes to process data traffic, in light of the fact that recently, problems attributable to an explosive increase in data traffic have increased.

SUMMARY

At least one embodiment of the present invention is intended to store and search for data traffic on the basis of a flow unit composed of packets.

At least one embodiment of the present invention is intended to search for data traffic on the basis of two-step flow-based index data.

In accordance with an aspect of the present invention, there is provided an apparatus for storing data traffic on a flow basis, including: a packet storage unit configured to receive packets corresponding to data traffic, and to temporarily store the packets using queues; a flow generation unit configured to generate flows by grouping the packets by means of a hash function using information about each of the packets as input, and to store the flows; and a metadata generation unit configured to generate metadata and index data corresponding to each of the flows, and to store the metadata and the index data.

The flow generation unit may include: a hash value generation unit configured to generate a hash value based on the IP address of each sender, the IP address of each recipient, the port address of the sender, and the port address of the recipient, which correspond to the packets; a generation unit configured to sort the packets according to their flows based on the hash values, to generate flows by grouping the packets, and to store the flows in flow buffers; and a flow storage unit configured to store the flows, stored in the flow buffers, on hard disks.

The flow storage unit may store each of the flows on the hard disks when the size of the flow stored in the flow buffers exceeds a specific value or the flow is terminated.

The flow buffers may include: an upstream content buffer configured to store a request packet; a header buffer configured to store the header of a response packet corresponding to the request, packet; and downstream content buffers configured to store the body of the response packet.

The downstream content buffers may include an HTTP response header buffer configured to store response headers of packets corresponding to HTTP data traffic; and an HTTP response body buffer configured to stores the response bodies of the packets.

The flow storage unit may store the address of internal data of a body corresponding to a first flow in a flow data map inside a second flow when the internal data of the body corresponding to the first flow is the same as the internal data of a body corresponding to the second flow.

The metadata generation unit may generate the metadata including the IP address of a sender, the IP address of a recipient, the port address of the sender, the port address of the recipient, the internal address of a hard disk on which the flow has been stored, and the start time and end time of the flow, which correspond to the flow, and the index data including the IP address of the sender, the IP address of the recipient, the port address of the sender, and the port address of the recipient, which correspond to the flow.

The metadata and the index data may be stored on a solid state drive (SSD), and the data traffic may be stored on the hard disks.

In accordance with another aspect of the present invention, there is provided an apparatus for searching for data traffic on a flow basis, including: a flow storage unit configured to store flows generated by arranging packets corresponding to data traffic using information about each of the packets and a hash function; a metadata storage unit configured to store metadata and index data corresponding to each of the flows; and a search unit configured to search for a flow stored in the flow storage unit based on information about the flow.

The search unit may include a Bloom filter configured to store the IP address of a sender, the IP address of a recipient, the port address of the sender, and the port address of the recipient, which correspond to the flow.

The search unit may determine whether a flow is present in the flow storage unit using any one of the IP address of the sender, the IP address of the recipient, the port address of the sender, and the port address of the recipient, which correspond to the flow, and the Bloom filter.

If it is determined using the Bloom filter that the flow is present, the search unit may search for metadata corresponding to the flow using the index data, and then may search for the flow based on the metadata.

The flow storage unit may store the flows on hard disks.

The metadata storage unit may store the metadata and the index data on a solid state drive (SSD).

In accordance with still another aspect of the present invention, there is provided a method of storing data traffic on a flow basis, including: receiving packets corresponding to data traffic, and temporarily storing the packets using queues; generating flows by arranging the packets using information about each of the packets and a hash function, and storing the flows; and generating metadata and index data corresponding to each of the flows.

Generating the flows may include: generating a hash value based on the IP address of each sender, the IP address of each recipient, the port address of the sender, and the port address of the recipient, which correspond to the packets; generating flows by grouping the packets based on the hash values, and storing the flows in flow buffers; and storing the flows, stored in the flow buffers, on hard disks.

Storing the flows may include storing each of the flows on the hard disks when the size of the flow stored in the flow buffers exceeds a specific value or the flow is terminated.

The flow buffers may include: an upstream content buffer configured to store a request packet; a header buffer configured to store the header of a response packet corresponding to the request packet; and downstream content buffers configured to store the body of the response packet.

The downstream content buffers may include an HTTP response header buffer configured to store response headers of packets corresponding to HTTP data traffic; and an HTTP response body buffer configured to stores the response bodies of the packets.

Storing the flows may include storing an address of internal data of a body corresponding to a first flow in a flow data map inside a second flow when the internal data of the body corresponding to the first flow is identical to internal data of a body corresponding to the second flow.

Generating the metadata and the index data may include generating the metadata including the IP address of a sender, the IP address of a recipient, the port address of the sender, the port address of the recipient, the internal address of a hard disk on which the flow has been stored, and the start time and end time of the flow, which correspond to the flow, and the index data including the IP address of the sender, the IP address of the recipient, the port address of the sender, and the port address of the recipient, which correspond to the flow.

Generating the metadata and the index data may include storing the generated metadata and index data on a solid state drive (SSD).

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings. Redundant descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

Embodiments of the present invention are described in detail with reference to the accompanying diagrams.

Figure 1:
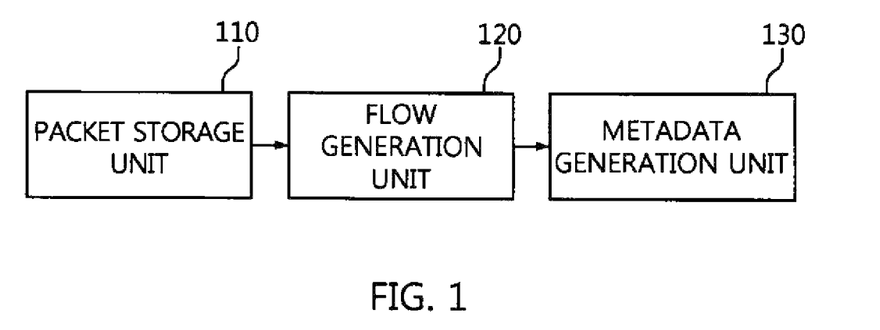
FIG. 1 is a block diagram showing an apparatus for storing data traffic on a flow basis according to an embodiment of the present invention.

FIG. 1 is a block diagram showing an apparatus for storing data traffic on a flow basis according to an embodiment of the present invention.

A packet storage unit 110 receives packets corresponding to data traffic, and temporarily stores the packets using queues.

In this case, a high-speed Network Interface Card (NIC) may receive the packets corresponding to the data traffic.

In this case, the efficiency of communication between threads and a disk write task can be increased by temporarily storing the packets using the queues and transferring the temporarily stored packets at one time without transmitting the received packets to a CPU and processing them.

A flow generation unit 120 generates flows by arranging packets using information about each of the packets and a hash function, and stores the flows.

In this case, arranging packets refers to grouping packets that are used when a single task is performed.

In this case, the term "flow" used herein may refer to a set of packets that are used to perform a single task.

In this case, when generating the flows by arranging the packets, the flow generation unit 120 may generate the flows by arranging the packets using information about each of the packets and hash values generated using a hash function.

In this case, a method of arranging packets is not limited to a specific method. When hash values generated from respective packets are the same, a single flow may be generated by arranging packets having the same hash value.

In this case, the information about each of the packets may be information including the IP address of a sender, the IP address of a recipient, the port address of the sender, and the port address of the recipient, which correspond to the packet.

In this case, the flow generation unit 120 may temporarily store the generated flows in flow buffers. When the size of data stored in the flow buffers exceeds a specific value or a flow is terminated, the flows temporarily stored in the flow buffers may be transmitted to hard disks and stored on the hard disks. There is no limitation regarding the specific value. When more frequent movement from the flow buffers to the hard disks is required, the specific value may be adjusted to a smaller value. In contrast, when the efficiency of transmission to the hard disks is increased, the specific value is adjusted to a larger value, and thus a larger amount of data may be transmitted at one time.

In this case, the flow buffers in which the flows are temporarily stored include a packet header buffer configured to store the headers of all the packets of a corresponding flow that is temporarily stored, an upstream content buffer configured to store the payload of a request packet, and downstream content buffers configured to store the payload of a response packet corresponding to the request packet. The downstream content buffers include an HTTP response header buffer configured to store an HTTP response header and an HTTP response body buffer configured to store an HTTP response body, in the case of HTTP data traffic. Although a conventional buffer stores both a request packet and a response packet in a single buffer without dividing each packet into a header and a payload, the flow buffers used in the present invention include the header buffer, the upstream content buffer and the downstream content buffers in order to separately store the header and the payload of the packet.

In this case, the flow storage unit 120 stores the address of the internal data of a body corresponding to a first flow in a flow data map inside a second flow when the internal data of the body corresponding to the first flow is the same as the internal data of a body corresponding to the second flow. This is intended to increase the efficiency of storage space. To prevent the waste of storage space that occurs when all redundant data is stored, when redundant data is present in the internal body data of the response packets inside flows, the redundant data is eliminated from a flow, and the address of the same data stored in another flow is stored in a flow data map inside the other flow. This is described in detail with reference to FIG. 4.

The metadata generation unit 130 generates metadata and index data corresponding to each flow.

In this case, the metadata may include the IP address of a sender, the IP address of a recipient, the port address of the sender, the port address of the recipient, the internal address of a hard disk on which the flow has been stored, and the start time and end time of the flow, which correspond to the flow.

In this case, the index data may include the IP address of the sender, the IP address of the recipient, the port address of the sender, and the port address of the recipient.

In this case, the index data may include the IP address of the sender, the IP address of the recipient, the port address of the sender, and the port address of the recipient among the data included in the metadata. When the metadata is directly used to search for a flow, a reduction in search speed may occur because the size of metadata is large. Accordingly, a reduction in search speed can be prevented using a method of determining a search target flow using the index data in which part of the metadata has been stored and then fetching the address of the hard disk at which the flow has been stored using the metadata.

In this case, processing speed can be improved by storing the index data and the metadata on a solid state drive (SSD), instead of the hard disks.

Figure 2:
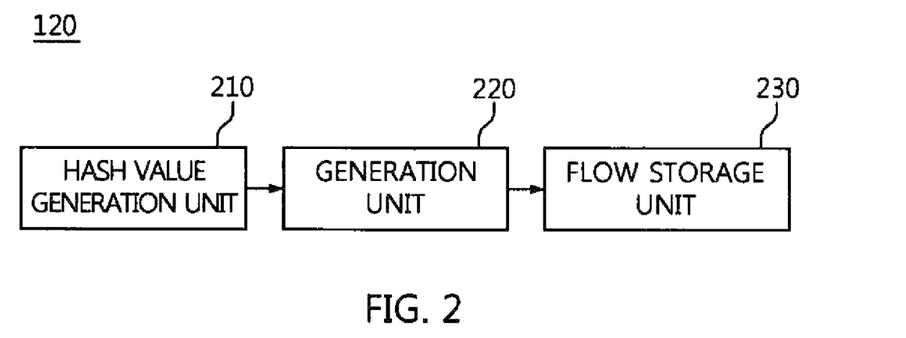
FIG. 2 is a block diagram showing an embodiment of the flow generation unit shown in FIG. 1.

FIG. 2 is a block diagram showing an embodiment of the flow generation unit shown in FIG. 1.

Referring to FIG. 2, the flow generation unit 120 includes a hash value generation unit 210, a generation unit 220, and a flow storage unit 230.

The hash value generation unit 210 generates a hash value by applying a hash function using the IP address of the sender, the IP address of the recipient, the port address of the sender, and the port address of the recipient, corresponding to a packet, as input.

In this case, the hash function refers to an algorithm that maps data of an arbitrary length to data of a fixed length. The hash function has a characteristic in which input varies when a hash value varies. Accordingly, it is possible to group packets and generate a flow using a hash value generated by applying the hash function to an input value.

The generation unit 220 sorts packets according to their flows based on the hash values, generates flows by grouping the packets, and stores the flows in the flow buffers.

In this case, although a method of sorting packets according to their flows is not limited to a specific method, flows may be generated by grouping packets having the same hash value.

In this case, the generation unit 220 may temporarily store the generated flows in the flow buffers. When the size of data stored in the flow buffers exceeds a specific value or a flow is terminated, the flows temporarily stored in the flow buffers may be transmitted to hard disks and stored on the hard disks. There is no limitation regarding the specific value. When more frequent movement from the flow buffers to the hard disks is required, the specific value may be adjusted to a smaller value. In contrast, when the efficiency of transmission to the hard disks is increased, the specific value is adjusted to a larger value, and thus a larger amount of data may be transmitted at one time.

In this case, the flow buffers in which the flows are temporarily stored include a packet header buffer configured to store the headers of all the packets of a corresponding flow that is temporarily stored, an upstream content buffer configured to store the payload of a request packet, and downstream content buffers configured to store the payload of a response packet corresponding to the request packet. The downstream content buffers include an HTTP response header buffer configured to store an HTTP response header and an HTTP response body buffer configured to store an HTTP response body, in the case of HTTP data traffic. Although a conventional buffer stores both a request packet and a response packet in a single buffer without dividing each packet into a header and a payload, the flow buffers used in the present invention include the header buffer, the upstream content buffer and the downstream content buffers in order to separately store the header and the payload of the packet.

The flow storage unit 230 stores the flows, stored in the flow buffers, on hard disks.

In this case, the flow storage unit 230 stores the address of the internal data of a body corresponding to a first flow in a flow data map inside a second flow when the internal data of the body corresponding to the first flow is the same as the internal data of a body corresponding to the second flow. This is intended to increase the efficiency of storage space. To prevent the waist of storage space that occurs when all redundant data is stored, when redundant data is present in the internal body data of the response packets inside flows, the redundant data is eliminated from a flow, and the address of the same data stored in another flow is stored in a flow data map inside the other flow. This is described in detail with reference to FIG. 4.

Figure 3:
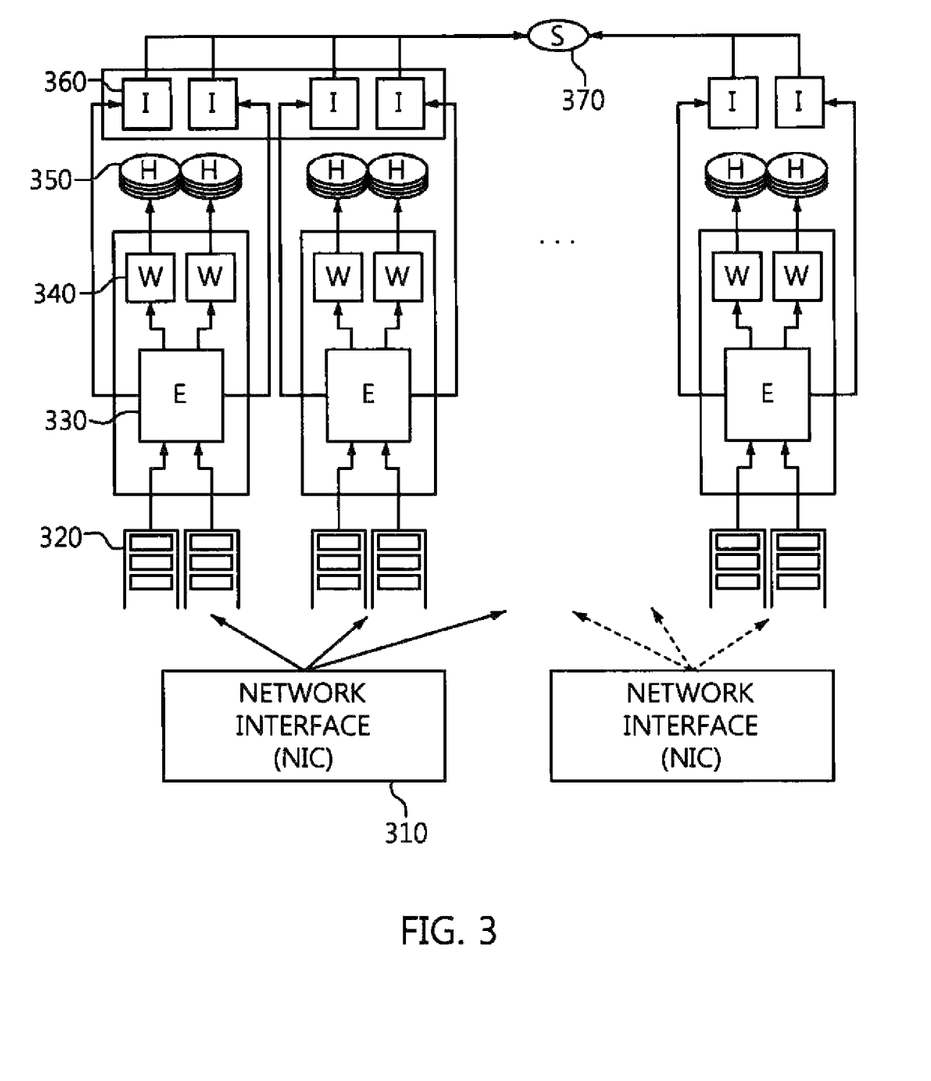
FIG. 3 is a diagram showing an apparatus for storing data traffic on a flow basis according to an embodiment of the present invention.

FIG. 3 is a diagram showing an apparatus for storing data traffic on a flow basis according to an embodiment of the present invention.

The packet storage unit 110, the flow generation unit 120 and the metadata generation unit 130 shown in FIG. 1 may be implemented using threads within a central processing unit (CPU).

First, the threads within the CPU may include three types of threads: engine threads 330, writing threads 340, and index threads 350.

The engine threads 330 may be responsible for the detection of packets from the high-speed NIC 310, the generation of flows, the management of flows, and the generation of index data.

The writing threads 340 may be responsible for the periodical storage of flow data, present in the flow buffers on hard disks 350. In this case, the writing thread 340 may share the flow buffers with the engine threads 330.

The index threads 360 may be responsible for the storage of metadata and index data corresponding to each of the flows on an SSD 370. In this case, the index threads 360 share the metadata and index data of the flows with the engine threads 330.

Referring to FIG. 3, the storage of flows by the apparatus for storing data traffic on a flow basis according to an embodiment of the present invention is described.

First, the packet storage unit 110 receives packets corresponding to data traffic from the NIC 310, and temporarily stores the packets using queues 320.

In this case, the packet storage unit 110 may be performed using the engine threads 330.

In this case, the efficiency of communication between threads and a disk write task can be increased by temporarily storing the packets using the queues and transferring the temporarily stored packets, at one time without transmitting the received packets to a CPU and processing them.

Furthermore, the flow generation unit 120 generates flows by, arranging packets using information about each of the packets and a hash function, and stores the generated flows on the hard disks 350.

In this case, the flow generation unit 120 may generate flows using engine threads 330, and may store the flows on the hard disks 350 using the writing threads 340.

In this case, arranging packets refers to grouping packets that are used when a single task is performed.

In this case, the term "flow" used herein may refer to a set of packets that are used to perform a single task.

In this case, when generating the flows by arranging the packets, the flow generation unit 120 may generate the flows by arranging the packets using information about each of the packets and hash values generated using a hash function.

In this case, a method of arranging packets is not limited to a specific method. When hash values generated from respective packets are the same, a single flow may be generated by arranging packets having the same hash value.

In this case, the information about each of the packets may be information including the IP address of a sender, the IP address of a recipient, the port address of the sender, and the port address of the recipient, which correspond to the packet.

Furthermore, the metadata generation unit 130 may generate metadata and index data corresponding to each of the flows, and may store the metadata and index data on the SSD 370.

In this case, the metadata generation unit 130 may generate the metadata and index data using the engine threads 330, and may store the metadata and index data on the SSD 370 using the index thread.

In this case, the metadata may include the IP address of a sender, the IP address of a recipient, the port address of the sender, the port address of the recipient, the internal address of a hard disk on which the flow has been stored, and the start time and end time of the flow, which correspond to the flow.

In this case, the index data may include the IP address of the sender, the IP address of the recipient, the port address of the sender, and the port address of the recipient.

In this case, the index data may include the IP address of the sender, the IP address of the recipient, the port address of the sender, and the port address of the recipient among the data included in the metadata. When the metadata is directly used to search for a flow, a reduction in search speed may occur because the size of metadata is large. Accordingly, a reduction in search speed can be prevented using a method of determining a search target flow using the index data in which part of the metadata has been stored and then fetching the address of the hard disk at which the flow has been stored using the metadata.

Figure 4:
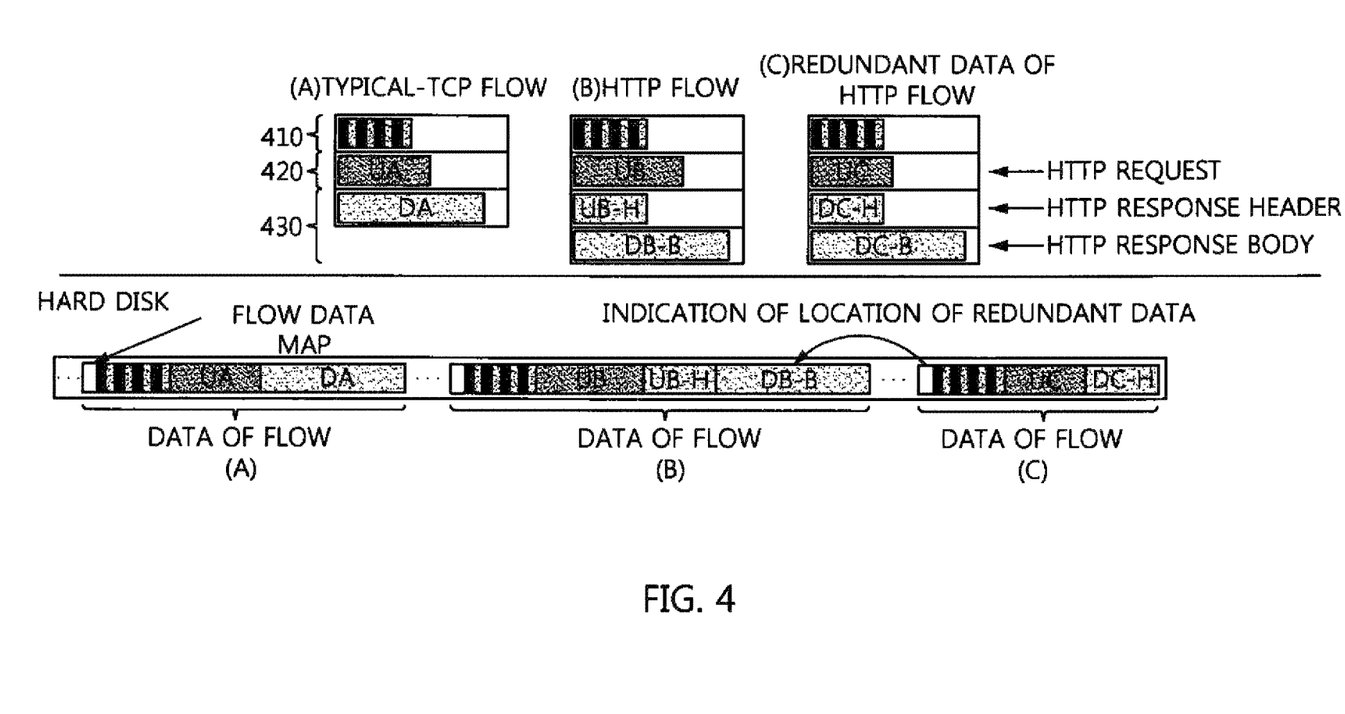
FIG. 4 is a diagram showing the storage of flows using an apparatus for storing data traffic on a flow basis according to an embodiment of the present invention.

FIG. 4 is a diagram showing the storage of flows using an apparatus for storing data traffic on a flow basis according to an embodiment of the present invention.

Referring to FIG. 4(a), in the case of TCP data traffic, packets are divided and stored in a header buffer, an upstream content buffer, and a downstream content buffer. In this case, the headers of packets corresponding to TCP data traffic may be stored in the header buffer, the payload of a request packet is stored in the upstream content buffer, and the payload of a response packet may be stored in the downstream content buffer.

Furthermore, in the present invention, in the case of HTTP data traffic, the payloads of response packets are divided into HTTP response headers and bodies. The HTTP response headers are stored in a HTTP response header buffer, and the HTTP response bodies are stored in an HTTP response body buffer. The downstream content buffers may include the HTTP response header buffer and the HTTP response body buffer. Referring to the HTTP flow of FIG. 4(b), it can be seen that the HTTP response headers and bodies are separately stored in the downstream content buffers. That is, it can be seen that flow data used in the present invention includes a flow data map, request packets, and the headers and bodies of response packets corresponding to the request packets.

The flow storage unit 230 of the flow generation unit 120 may store temporarily stored flow data on the hard disks, and packet headers may be stored in the order in which the packets of each flow are received. The flow data stored on the hard disks is shown at the lower end of FIG. 4.

In this case, the flow storage unit 120 stores the address of the internal data of a body corresponding to a first flow in a flow data map inside a second flow when the internal data of the body corresponding to the first flow is the same as the internal data of a body corresponding to the second flow. This is intended to increase the efficiency of storage space. To prevent the waste of storage space that occurs when all redundant data is stored, when redundant data is present in the internal body data of the response packets inside flows, the redundant data is eliminated from a flow, and the address of the same data stored in another flow is stored in a flow data map inside the other flow.

Referring to FIG. 4, this is described in greater detail.

In the case of the HTTP flow and the redundant data of the HTTP flow shown in FIG. 4, the body parts of response packets are the same. In this case, when data redundant between flow (b) and flow (c) is all stored, a problem arises in that storage space is wasted. Accordingly, data indicative of the location of redundant data is stored in a flow data map that constitutes part of flow data. From FIG. 4, it can be seen that redundant data is not stored in flow (c) but is stored in flow (b). In this case, data indicative of a location at which the internal redundant data of flow (b) has been stored may be stored in the flow data map of flow (c).

In the case of HTTP data traffic, request packets to response packets are the same, and thus the waste of storage space can be significantly reduced when the method shown in FIG. 4 is used.

Figure 5:
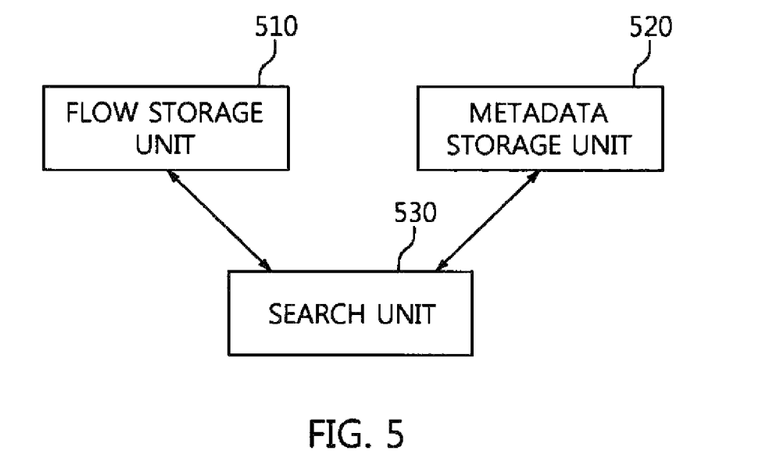
FIG. 5 is a block diagram showing an apparatus for searching for data traffic on a flow basis according to an embodiment of the present invention.

FIG. 5 is a block diagram showing an apparatus for searching for data traffic on a flow basis according to an embodiment of the present invention.

Referring to FIG. 5, the apparatus for searching for data traffic on a flow basis according to the present embodiment includes a flow storage unit 510, a metadata storage unit 520, and a search unit 530.

The flow storage unit 510 stores flows generated by arranging packets using information about each of the packets corresponding to data traffic and a hash function.

In this case, the stored flows may be flows generated by the apparatus for storing data traffic on a flow basis, which is shown in FIG. 1.

In this case, the flows may be stored on the hard disks.

The metadata storage unit 520 stores metadata and index data corresponding to each of the flows.

In this case, the stored metadata and index data may be metadata and index data generated by the apparatus for storing data traffic on a flow basis, which is shown in FIG. 1.

In this case, the metadata and the index data may be stored on an SSD in order to improve search speed.

In this case, the metadata may include the IP address of a sender, the IP address of a recipient, the port address of the sender, the port address of the recipient, the internal address of a hard disk on which the flow has been stored, and the start time and end time of the flow, which correspond to the flow.

In this case, the index data may include the IP address of the sender, the IP address of the recipient, the port address of the sender, and the port address of the recipient.

The search unit 530 searches for the flow, stored in the flow storage unit 510, based on the information of the flow, the metadata and the index data.

In this case, the search unit 530 may search for metadata corresponding to the search target specific flow using the information of the flow including any one of the IP address of the recipient, the IP address of the sender, the port address of the recipient, and the port address of the sender and the index data including the IP address of the recipient, the IP address of the sender, the port address of the recipient, and the port address of the sender.

In this case, the search unit 530 may extract the address of the hard disk where a flow included in metadata corresponding to a specific flow has been stored, and may search for an internal flow inside the hard disk.

In this case, the search unit 530 may include a Bloom filter including the IP address of the sender, the IP address of the recipient, the port address of the sender, and the port address of the recipient, which correspond to the flow, in order to improve search speed.

In this case, the Bloom filter is a filter that is capable of determining whether information is not present. Whether information is present cannot be determined, and whether information is present can be estimated. A detailed description of the Bloom filter is omitted.

In this case, the search unit 530 may determine whether a search target flow is present using the Bloom filter. If a flow is not present, search may be terminated. If it is determined using the Bloom filter that a flow is present, this is not accurate information, and thus it is determined using the index data whether the flow is present. If the flow is present, the address of the hard disk where the flow has been stored is extracted from metadata corresponding to the flow, and then the flow may be searched for.

That is, since the Bloom filter can rapidly determine that a flow is not present, the present invention can effectively increase search speed.

Figure 6:
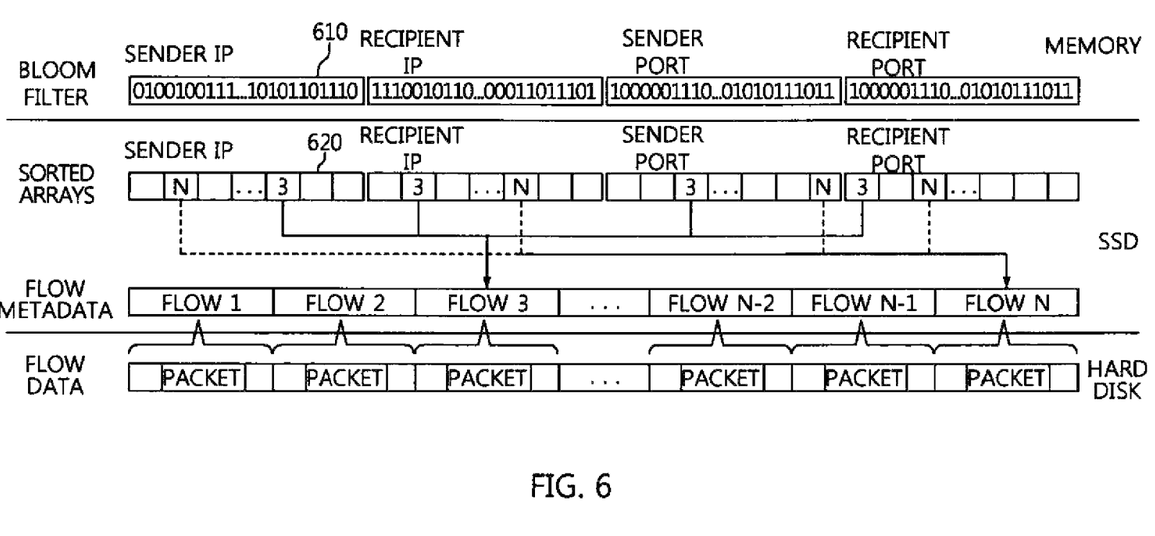
FIG. 6 is a diagram showing search for a flow using an apparatus for searching for data traffic on a flow basis according to an embodiment of the present invention.

FIG. 6 is a diagram showing search for a flow using an apparatus for searching for data traffic on a flow basis according to an embodiment of the present invention.

Referring to FIG. 6, a Bloom filter, sorted arrays in which index data is arranged, flow metadata and flow data are shown.

In this case, the Bloom filter may be stored in memory and thus it can be rapidly determined whether a flow is not present.

In this case, the index data and the flow metadata may be stored in the SSD.

In this case, the flow data may be stored on the hard disks.

In this case, in the Bloom filter, the IP address of the sender, the IP address of the recipient, the port address of the sender, and the port address of the recipient are separate from one another, and thus it may be rapidly determined based on only the IP address 610 of a sender whether a flow is not present.

Referring to FIG. 6, search for a flow according to an embodiment of the present invention is described.

First, it is determined whether a flow is not present using the input IP address of a sender and the Bloom filter 610. If, as a result of the determination, it is determined that the flow is not present, search is terminated.

Furthermore, if, as a result of the determination, it is determined that the flow is present, this information is not accurate information, and thus it is determined using index data whether the flow is present. In the case of FIG. 6, it is determined that flow 3 is present, the address of the hard disk where flow 3 has been stored is extracted from metadata, and packets corresponding to flow 3 may be searched for using the address of the hard disk.

Figure 7:
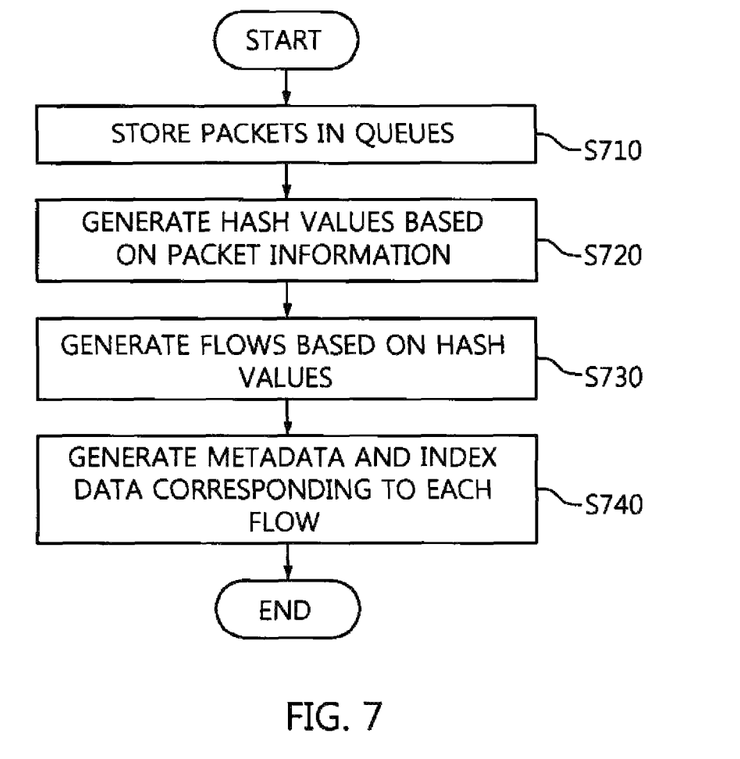
FIG. 7 is an operation flowchart showing a method of storing data traffic on a flow basis according to an embodiment of the present invention.

FIG. 7 is an operation flowchart showing a method of storing data traffic on a flow basis according to an embodiment of the present invention.

Referring to FIG. 7, packets corresponding to data traffic are received and the packets are temporarily stored using queues at step S710.

In this case, a high-speed Network Interface Card (NIC) may receive the packets corresponding to the data traffic.

In this case, the efficiency of communication between threads and a disk write task can be increased by temporarily storing the packets using the queues and transferring the temporarily stored packets at one time without transmitting the received packets to a CPU and processing them.

In this case, step S710 may be performed by the packet storage unit 110 shown in FIG. 1.

Furthermore, hash values may be generated using packet information and a hash function at step S720.

In this case, the hash function refers to an algorithm that maps data of an arbitrary length to data of a fixed length. The hash function has a characteristic in which input varies when a hash value varies. Accordingly, it is possible to group packets and generate a flow using a hash value generated by applying the hash function to an input value.

Furthermore, flows are generated by arranging the packets using the hash values and are stored at step S730.

In this case, arranging packets refers to grouping packets that are used when a single task is performed.

In this case, the term "flow" used herein may refer to a set of packets that are used to perform a single task.

In this case, when generating the flows by arranging the packets, the flow generation unit 120 may generate the flows by arranging the packets using information about each of the packets and hash values generated using a hash function.

In this case, a method of arranging packets is not limited to a specific method. When hash values generated from respective packets are the same, a single flow may be generated by arranging packets having the same hash value.

In this case, the information about each of the packets may be information including the IP address of a sender, the IP address of a recipient, the port address of the sender, and the port address of the recipient, which correspond to the packet.

In this case, the flow generation unit 120 may temporarily store the generated flows in flow buffers. When the size of data stored in the flow buffers exceeds a specific value or a flow is terminated, the flows temporarily stored in the flow buffers may be transmitted to hard disks and stored on the hard disks. There is no limitation regarding the specific value. When more frequent movement from the flow buffers to the hard disks is required, the specific value may be adjusted to a smaller value. In contrast, when the efficiency of transmission to the hard disks is increased, the specific value is adjusted to a larger value, and thus a larger amount of data may be transmitted at one time.

In this case, the flow buffers in which the flows are temporarily stored include a packet header buffer configured to store the headers of all the packets of a corresponding flow that is temporarily stored, an upstream content buffer configured to store the payload of a request packet, and downstream content buffers configured to store the payload of a response packet corresponding to the request packet. The downstream content buffers include an HTTP response header buffer configured to store an HTTP response header and an HTTP response body buffer configured to store an HTTP response body, in the case of HTTP data traffic. Although a conventional buffer stores both a request packet and a response packet in a single buffer without dividing each packet into a header and a payload, the flow buffers used in the present invention include the header buffer, the upstream content buffer and the downstream content buffers in order to separately store the header and the payload of the packet.

In this case, the flow storage unit 120 stores the address of the internal data of a body corresponding to a first flow in a flow data map inside a second flow when the internal data of the body corresponding to the first flow is the same as the internal data of a body corresponding to the second flow. This is intended to increase the efficiency of storage space. To prevent the waste of storage space that occurs when all redundant data is stored, when redundant data is present in the internal body data of the response packets inside flows, the redundant data is eliminated from a flow, and the address of the same data stored in another flow is stored in a flow data map inside the other flow. This has been described in detail with reference to FIG. 4.

Furthermore, metadata and index data corresponding to each flow are generated at step S740.

In this case, the metadata may include the IP address of a sender, the IP address of a recipient, the port address of the sender, the port address of the recipient, the internal address of a hard disk on which the flow has been stored, and the start time and end time of the flow, which correspond to the flow.

In this case, the index data may include the IP address of the sender, the IP address of the recipient, the port address of the sender, and the port address of the recipient.

In this case, the index data may include the IP address of the sender, the IP address of the recipient, the port address of the sender, and the port address of the recipient among the data included in the metadata. When the metadata is directly used to search for a flow, a reduction in search speed may occur because the size of metadata is large. Accordingly, a reduction in search speed can be prevented using a method of determining a search target flow using the index data in which part of the metadata has been stored and then fetching the address of the hard disk at which the flow has been stored using the metadata.

In this case, processing speed can be improved by storing the index data and the metadata on an SSD, instead of the hard disks.

According to at least one embodiment of the present invention, data traffic can be stored and searched for on the basis of a flow unit composed of packets, thereby further increasing storage and search speeds.

According to at least one embodiment of the present invention, data traffic can be searched for based on two-step flow-based index data, thereby increasing search speed.

According to at least one embodiment of the present invention, data traffic can be stored on a flow unit basis, other than a packet unit basis, thereby increasing the efficiency of communication and a disk write task.

An embodiment of the present invention may be implemented in a computer system, e.g., as a computer readable medium. A computer system may include one or more of a processor, a memory, a user input device, a user output device, and a storage, each of which communicates through a bus. The computer system may also include a network interface that is coupled to a network. The processor may be a central processing unit (CPU) or a semiconductor device that executes processing instructions stored in the memory and/or the storage. The memory and the storage may include various forms of volatile or non-volatile storage media. For example, the memory may include a read-only memory (ROM) and a random access memory (RAM).

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

The apparatus and method for storing data traffic on a flow basis and the apparatus for searching for data traffic on a flow basis according to the present invention are not limited to the configurations and methods of the above-described embodiments, but some or all of the embodiments may be selectively combined such that the embodiments can be modified in various manners.

What is claimed is:

1. An apparatus for storing data traffic on a flow basis, comprising:
   one or more units being configured and executed by a processor using algorithm associated with least one non-transitory storage device, the one or more units comprising, a packet storage unit configured to receive packets corresponding to data traffic, and to temporarily store the packets using queues;

a flow generation unit configured to generate flows by grouping the packets by means of a hash value using algorithm that maps data of an arbitrary length to data of a fixed length of each of the received packets, the hash value being applied as an input value, when the input value varies the hash value varies accordingly, and to store the flows in flow buffers in response to detection of a size of the flows stored in the flow buffers exceeding a specific value or the flows being terminated, and in response to detection of internal data of a body corresponding to first flow being identical to internal data of a body corresponding to second flow, the flow buffers configured to store an address of internal data of a body corresponding to the first flow in a flow data map inside the second flow to increase efficiency of the packet storage unit by preventing all redundant data, and in response to detection of the redundant data being present in the internal data of the packets inside flows, the redundant data being eliminated from flows, and an address of the same data stored in third flow being stored in a flow data map inside the third flow; and a metadata generation unit configured to generate metadata and index data corresponding to each of the flows, and to store the metadata and the index data, wherein the flow generation unit comprises:

a hash value generation unit configured to generate a hash value based on an IP address of each sender, an IP address of each recipient, a port address of the sender, and a port address of the recipient, which correspond to the packets, a generation unit configured to sort the packets according to their flows based on the hash values, to generate flows by grouping the packets, and to store the flows in flow buffers, and a flow storage unit configured to store the flows, stored in the flow buffers, on hard disks, and wherein the flow buffers comprise:

an upstream content buffer configured to store a request packet, a header buffer configured to store a header of a response packet corresponding to the request packet, and downstream content buffers configured to store a body of the response packet.

2. The apparatus of claim 1, wherein the flow storage unit stores each of the flows on the hard disks.

3. The apparatus of claim 1, wherein the metadata generation unit generates the metadata including an IP address of a sender, an IP address of a recipient, a port address of the sender, a port address of the recipient, an internal address of a hard disk on which the flows are stored, and a start time and end time of the flows, and the index data including the IP address of the sender, the IP address of the recipient, the port address of the sender, and the port address of the recipient, which correspond to the flows.

4. The apparatus of claim 3, wherein the metadata and index data are stored on a solid state drive (SSD), and the data traffic is stored on the hard disks.

5. An apparatus for searching for data traffic on a flow basis, comprising:

one or more units being configured and executed by a processor using algorithm associated with least one non-transitory storage device, the one or more units comprising, a flow storage unit configured to store flows generated by arranging packets corresponding to data traffic using information about each of the packets using a hash value using algorithm that maps data of an arbitrary length to data of a fixed length of each of the packets, the hash value being applied as an input value, when the input value varies the hash value varies accordingly;

a metadata storage unit configured to store metadata and index data corresponding to each of the flows; and a search unit configured to search for a flow stored in the flow storage unit based on information about the flow, the search unit further configured to determine whether a flow is present in the flow storage unit using any one of the IP address of the sender, the IP address of the recipient, the port address of the sender, and the port address of the recipient, which correspond to the flow, and Bloom filter, and in response to determination using the Bloom filter that the flow is present, the search unit configured to search for metadata corresponding to the flow using the index data and then searches for the flow based on the metadata, wherein the flow storage unit stores the flows on hard disks, and wherein the metadata storage unit stores the metadata and the index data on a solid state drive (SSD), wherein in response to detection of internal data of a body corresponding to first flow being identical to internal data of a body corresponding to second flow, the flow storage unit configured to store an address of internal data of a body corresponding to the first flow in a flow data map inside the second flow to increase efficiency of the flow storage unit by preventing all redundant data being stored, and in response to detection of redundant data being present in the internal data of the packets inside flows, the redundant data being eliminated from flows, and an address of the same data stored in third flow being stored in a flow data map inside the third flow.

6. The apparatus of claim 5, wherein the search unit comprises a Bloom filter configured to store an IP address of a sender, an IP address of a recipient, a port address of the sender, and a port address of the recipient, which correspond to the flow.

7. A method of storing data traffic on a flow basis, comprising:

receiving packets corresponding to data traffic, and temporarily storing the packets using queues;

generating flows by arranging the packets using information about each of the packets and a hash value using algorithm that maps data of an arbitrary length to data of a fixed length of each of the received packets, the hash value being applied as an input value, when the input value varies the hash value varies accordingly, and storing the flows in flow buffers in response to detection of a size of the flows stored in the flow buffers exceeding a specific value or the flows being terminated, and in response to detection of first internal data of a body corresponding to first flow being identical to internal second data of a body corresponding to second flow storing an address of internal data of a body corresponding to the first flow in a flow data map inside the second flow to increase efficiency of a packet storage unit by preventing all redundant data being stored, and in response to detection of redundant data being present in the internal data of the packets inside flows, eliminating the redundant data from flows, and storing an address of the same data in third flow in a flow data map inside the third flow; and generating metadata and index data corresponding to each of the flows, wherein generating the flows comprises:

generating a hash value based on an IP address of each sender, an IP address of each recipient, a port address of the sender, and a port address of the recipient, which correspond to the packets, generating flows by grouping the packets based on the hash values, and storing the flows in flow buffers, and storing the flows, stored in the flow buffers, on hard disks, and wherein the flow buffers comprise:

an upstream content buffer configured to store a request packet, a header buffer configured to store a header of a response packet corresponding to the request packet, and downstream content buffers configured to store a body of the response packet.

8. The method of claim 7, wherein generating the metadata and the index data comprises generating the metadata including an IP address of a sender, an IP address of a recipient, a port address of the sender, a port address of the recipient, an internal address of a hard disk on which the flow has been stored, and a start time and end time of the flows, and the index data including the IP address of the sender, the IP address of the recipient, the port address of the sender, and the port address of the recipient, which correspond to the flows.

9. The method of claim 8, wherein generating the metadata and, the index data comprises storing the generated metadata and index data on a solid state drive (SSD).

* * * * *